United States Patent
Araki et al.

(10) Patent No.: US 12,039,992 B2
(45) Date of Patent: Jul. 16, 2024

(54) VOICE CONTROL DEVICE AND VOICE CONTROL SYSTEM

(71) Applicant: Panasonic Intellectual Property Management Co., Ltd., Osaka (JP)

(72) Inventors: Junji Araki, Osaka (JP); Satoshi Abe, Osaka (JP); Takahiro Yamaguchi, Osaka (JP); Kenichi Kubota, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 219 days.

(21) Appl. No.: 17/627,398

(22) PCT Filed: Jul. 14, 2020

(86) PCT No.: PCT/JP2020/027376
§ 371 (c)(1),
(2) Date: Jan. 14, 2022

(87) PCT Pub. No.: WO2021/010397
PCT Pub. Date: Jan. 21, 2021

(65) Prior Publication Data
US 2022/0262385 A1  Aug. 18, 2022

(30) Foreign Application Priority Data
Jul. 17, 2019  (JP) .................. 2019-131955

(51) Int. Cl.
*G10L 21/0232* (2013.01)
*G10L 15/22* (2006.01)
(Continued)

(52) U.S. Cl.
CPC .......... *G10L 21/0232* (2013.01); *G10L 15/22* (2013.01); *H04R 3/12* (2013.01);
(Continued)

(58) Field of Classification Search
CPC ...... G10K 11/178; H04R 3/14; G10L 21/0232
See application file for complete search history.

(56) References Cited

U.S. PATENT DOCUMENTS

2007/0288110 A1  12/2007  Inoue et al.
2008/0025518 A1  1/2008  Mizuno et al.
(Continued)

FOREIGN PATENT DOCUMENTS

| JP | 2000307385 A | * | 11/2000 |
| JP | 2003-092799 | | 3/2003 |

(Continued)

OTHER PUBLICATIONS

International Search Report (ISR) from International Searching Authority (Japan Patent Office) in International Pat. Appl. No. PCT/JP2020/019149, dated Jul. 28, 2020, together with an English language translation.

(Continued)

*Primary Examiner* — Feng-Tzer Tzeng
(74) *Attorney, Agent, or Firm* — Greenblum and Bernstein, P.L.C.

(57) ABSTRACT

The voice control device includes a sound source signal input unit, a frequency determination unit, a band controller, a sound image controller, and a voice output unit. The sound source signal input unit inputs a sound source signal of content from a sound source. The frequency determination unit determines a cutoff frequency. The band controller acquires a high frequency signal in a frequency band equal to or higher than the cutoff frequency and a low frequency signal in a frequency band equal to or lower than the cutoff frequency, from the sound source signal of the content. The sound image controller generates a plurality of sound image control signals for controlling sound images of the plurality of speakers, by controlling at least one of a phase and a sound pressure level of the high frequency signal. The voice (Continued)

output unit outputs the low frequency signal to a first speaker, and outputs the plurality of sound image control signals to a second speaker composed of a plurality of speakers.

15 Claims, 19 Drawing Sheets

(51) Int. Cl.
  *H04R 3/12* (2006.01)
  *G10K 11/178* (2006.01)
  *H04R 3/14* (2006.01)

(52) U.S. Cl.
  CPC ...... *G10K 11/178* (2013.01); *G10L 2015/223* (2013.01); *H04R 3/14* (2013.01)

(56) References Cited

U.S. PATENT DOCUMENTS

| | | | |
|---|---|---|---|
| 2008/0260174 A1* | 10/2008 | Yokota | H04R 5/04 381/71.4 |
| 2009/0154713 A1 | 6/2009 | Kamiya | |
| 2012/0314871 A1 | 12/2012 | Koga | |
| 2012/0314889 A1 | 12/2012 | Mizuno et al. | |
| 2013/0243225 A1 | 9/2013 | Yokota | |
| 2014/0093096 A1* | 4/2014 | Sheen | H04R 3/14 381/99 |
| 2017/0061952 A1 | 3/2017 | Sakaguchi | |
| 2017/0323629 A1 | 11/2017 | Sakaguchi | |
| 2019/0014430 A1 | 1/2019 | Christoph | |
| 2019/0289421 A1 | 9/2019 | Koga | |
| 2020/0236490 A1 | 7/2020 | Koga | |

FOREIGN PATENT DOCUMENTS

| | | |
|---|---|---|
| JP | 2004-056262 | 2/2004 |
| JP | 2007-288677 | 11/2007 |
| JP | 2008-271067 | 11/2008 |
| JP | 2009-065452 | 3/2009 |
| JP | 2009-143495 | 7/2009 |
| JP | 2010-083267 | 4/2010 |
| JP | 5015611 | 8/2012 |
| JP | 2013-005021 | 1/2013 |
| JP | 2014-161111 | 9/2014 |
| JP | 2017-050847 | 3/2017 |

OTHER PUBLICATIONS

International Search Report (ISR) from International Searching Authority (Japan Patent Office) in International Pat. Appl. No. PCT/JP2020/027376, dated Oct. 13, 2020, together with an English language translation.

Office Action from European Patent Office (EPO) dated Aug. 30, 2022 for the related European Patent Application No. 20841254.4.

* cited by examiner

VOICE CONTROL DEVICE AND VOICE CONTROL SYSTEM

TECHNICAL FIELD

The present disclosure relates to a voice control device and a voice control system in a predetermined space. The present disclosure relates to a voice control device and a voice control system used in a predetermined space such as the inside of a closed structure disposed in an aircraft, a railroad vehicle, or the like.

BACKGROUND ART

Music services may be provided to passengers seated in moving objects such as noisy aircraft and vehicles. Since aircraft and railroad vehicles move at high speeds, various noises are generated in various places. Noise is generated, for example, by vibration generated from a power source engine or motor, or by collision noise between a moving object that is moving and air. The noise arrival direction, the volume (amplitude), and the noise arrival time (phase) differ depending on the seat.

PTL 1 discloses a method for reproducing an area of voice using a speaker array. In this method, a noise level is measured from the environmental sound, and the reproduced sound is adjusted such that at each frequency, the sound pressure of the reproduced sound reaching the reproduction line in the control line exceeds the noise level, and the sound pressure of the reproduced sound reaching the non-reproduction line in the control line does not exceed the noise level.

CITATION LIST

Patent Literature

PTL 1: Japanese Patent Unexamined Publication No. 2017-50847

SUMMARY OF THE INVENTION

The present disclosure provides a voice control device and a voice control system that are effective in effectively generating a sound field in a target space where noise is generated.

A voice control device of the present disclosure is a voice control device that controls output of voice signals from a plurality of speakers, in a predetermined space, and includes a sound source signal input unit, a frequency determination unit, a band controller, a sound image controller, and a voice output unit. The sound source signal input unit inputs a sound source signal of content from a sound source. The frequency determination unit determines a cutoff frequency. The band controller acquires a high frequency signal in a frequency band equal to or higher than the cutoff frequency and a low frequency signal in a frequency band equal to or lower than the cutoff frequency, from the sound source signal of the content. The sound image controller generates a plurality of sound image control signals for controlling sound images of the plurality of speakers, by controlling at least one of a phase and a sound pressure level of the high frequency signal. The voice output unit outputs the low frequency signal to a first speaker, and outputs the plurality of sound image control signals to a second speaker composed of a plurality of speakers.

A voice control system of the present disclosure includes the voice control device, a first speaker connected to the voice control device, and a second speaker connected to the voice control device. The second speaker has a plurality of speakers disposed in a row.

The voice control device and voice control system of the present disclosure are effective in effectively generating a sound field in a target space where noise is generated.

DESCRIPTION OF EMBODIMENTS

Hereinafter, exemplary embodiments will be described in detail with reference to the drawings as appropriate. However, more detailed explanation than necessary may be omitted. For example, detailed explanations of already well-known matters and duplicate explanations for substantially the same configuration may be omitted. This is to avoid unnecessary redundancy of the following description and to facilitate the understanding of those skilled in the art.

The accompanying drawings and the following description are provided for those skilled in the art to fully under-

1. First Exemplary Embodiment

A first exemplary embodiment provides a voice control device, a voice control system, and a voice control method capable of forming a sound field space in which a user can enjoy the content voice without headphones or earphones, while reducing noise in an environment where predetermined noise is generated such as an aircraft.

Hereinafter, an example of the case where the voice control system of the first exemplary embodiment is mounted on aircraft 100 will be described.

First, the sound environment in aircraft 100 will be described with reference to FIGS. 1 and 2.

Figure 1:
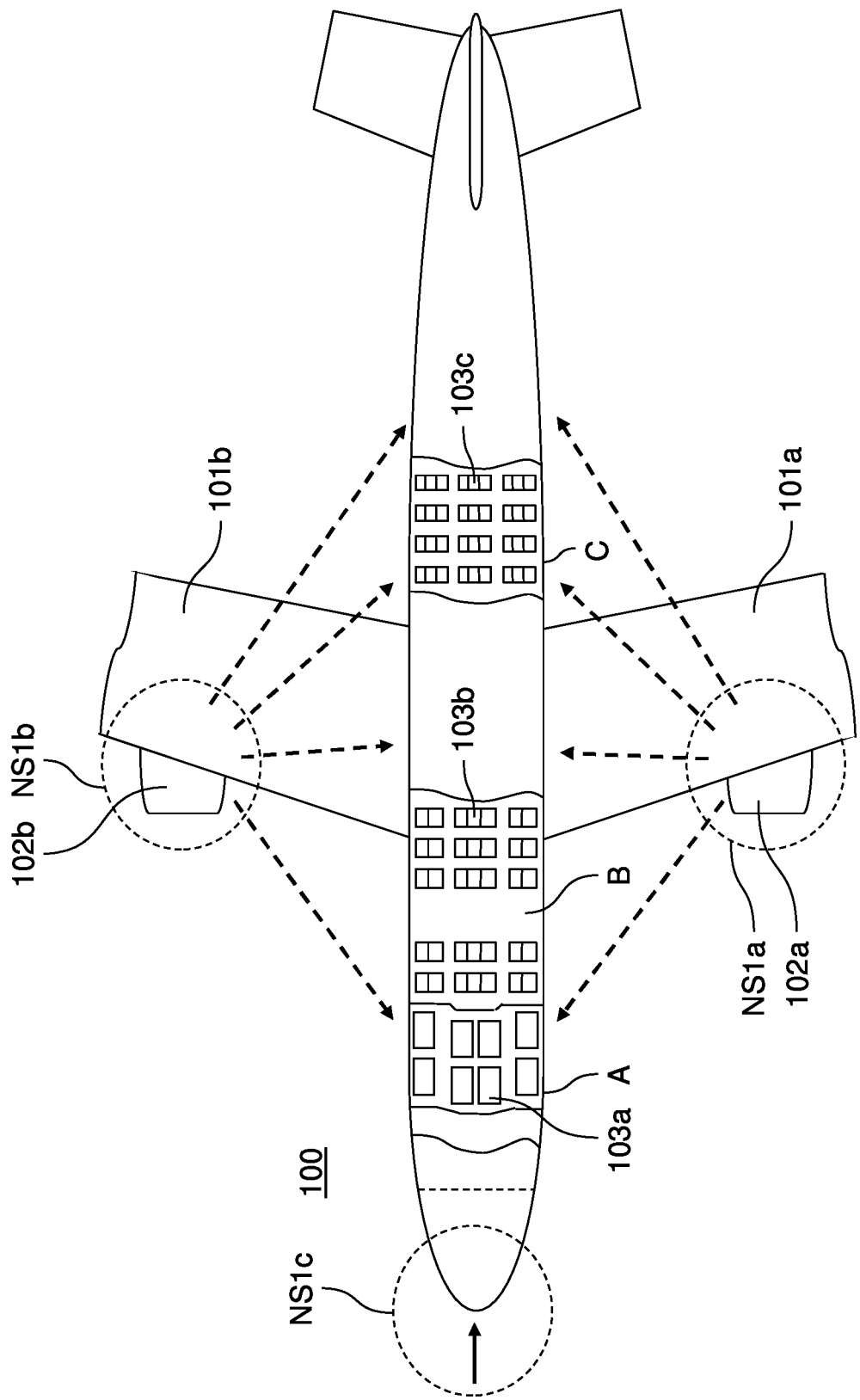
FIG. 1 schematically shows an aircraft in which a voice control system is installed.

As shown in FIG. 1, aircraft 100 includes left and right wings 101a and 101b, and engines 102a and 102b mounted on wings 101a and 101b, respectively. Here, considering the sound environment of space inside aircraft 100, sound emitted from engines 102a and 102b is a large noise source because it is accompanied by not only the rotating sound but also the reverberation of the air flow during flight.

Engines 102a and 102b act as external noise sources NS1a and NS1b, for example, with respect to seat rows 103a, 103b and 103c respectively installed in cabin A (for example, first class), cabin B (for example, business class) and cabin C (for example, economy class), in the aircraft. Further, the collision noise (wind noise) between the air flow and the tip portion, the side surface portion, and both wings 101a and 101b of the airframe accompanied by the movement of the airframe at high speed in the air layer acts as noise source NS1c. Therefore, the music providing service in aircraft 100 is adversely affected.

Further, in order to clean, maintain, and circulate the air inside the aircraft, an air conditioning system (not shown) equipped with pressurization, ventilation, and temperature control functions is mounted on aircraft 100. As will be described later, the sound generated by the air conditioning system also serves as a noise source in addition to noise sources NS1a, NS1b, and NS1c.

Figure 2:
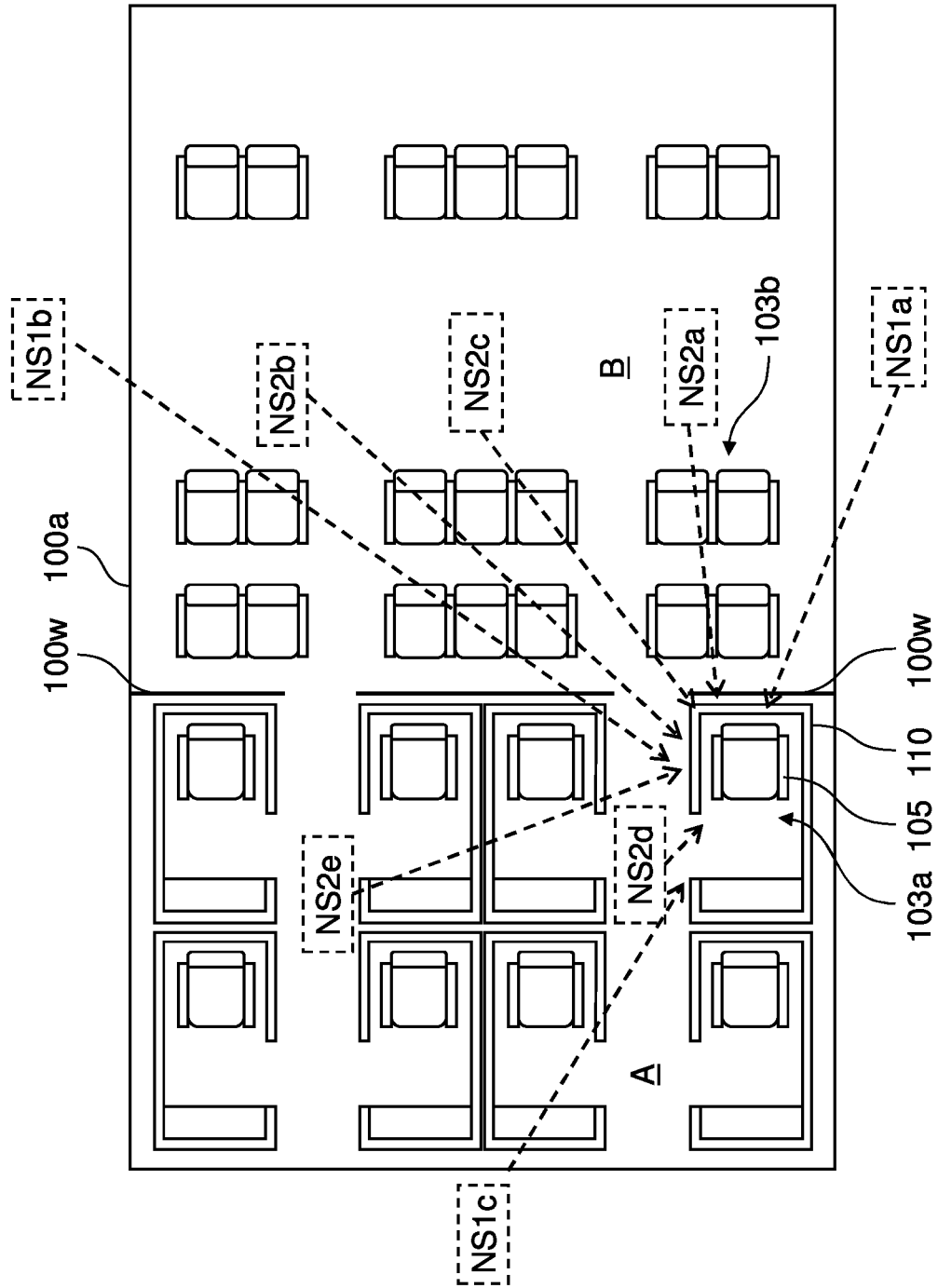
FIG. 2 shows an example of a noise source in the aircraft.

FIG. 2 is a plan view showing details of the installation environment of the voice control device. FIG. 2 shows an enlarged view of the arrangement of seats in cabin A and a part of cabin B in FIG. 1.

A cabin 100a is divided into cabins A and B by wall 100w, and cabins A and B are provided with seat rows 103a and 103b, respectively. On the other hand, as the sound environment in cabin 100a, there are noise sources NS1a and NS1b generated from engines 102a and 102b and wind noise (noise source NS1c) at the tip portion, side surface portion, and both wings of the airframe as external noise sources. Further, there are noise sources NS2a to NS2e from an air conditioning system or the like as noise sources inside cabin 100a.

For example, noise in one seat 105 disposed in cabin A is affected by noise from noise sources NS1a to NS1c caused by engines 102a and 102b (see FIG. 1) attached to the wings outside the window and the airflow noise and noise sources NS2a to NS2e caused by the air conditioning system, in seat 105.

Figure 3:
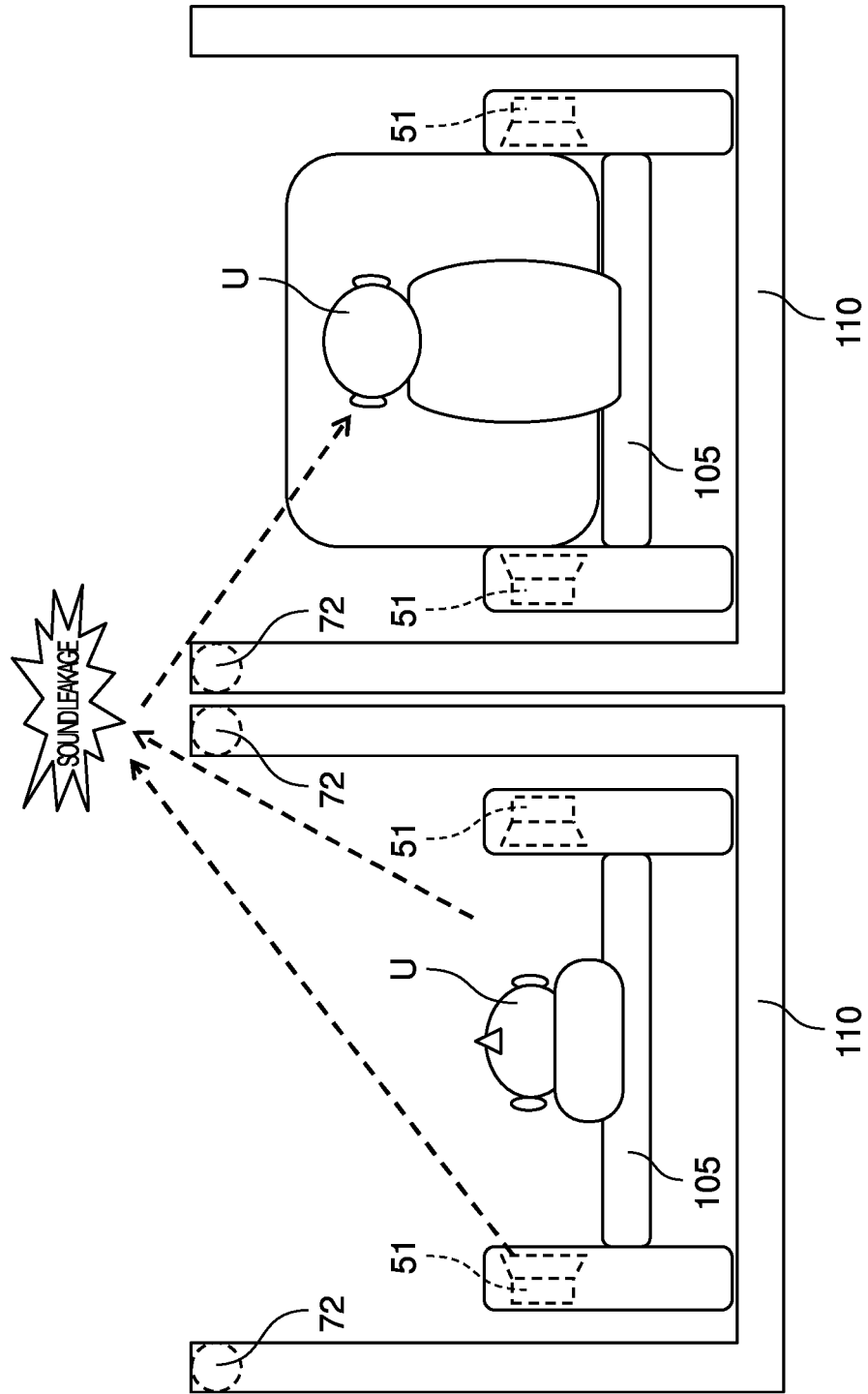
FIG. 3 is a plan view for explaining an installation environment of a voice control system in a seat.

In the first class shown in cabin A in FIG. 1, each seat 105 is surrounded by a target space for voice control (an example of a predetermined space) that is shell structure 110 as shown in FIG. 3. Shell structures 110 and 110 are provided with a system for reducing noise. As shown in FIG. 3, noise microphones 72 are disposed at predetermined positions of shell structures 110 and 110. Control sound speaker 51 is disposed in each seat 105. In this system, a control sound signal having a phase opposite to the noise acquired from noise microphone 72 is generated by the noise reduction control described later, and is output from control sound speaker 51. Thus, the noise in shell structures 110 and 110 is reduced.

On the other hand, inside shell structure 110, audio visual equipment such as a television and a radio for enjoying movies and music, a desk for businessmen, a PC connection power supply, and the like are disposed. Seats 105 in first class and the like are required to provide passengers (hereinafter referred to as users) with an environment in which the users can relax and concentrate on the business.

It is conceivable to use control sound speaker 51 for viewing and listening to movies, music, and the like. However, in that case, the following problems arise.

Figure 4:
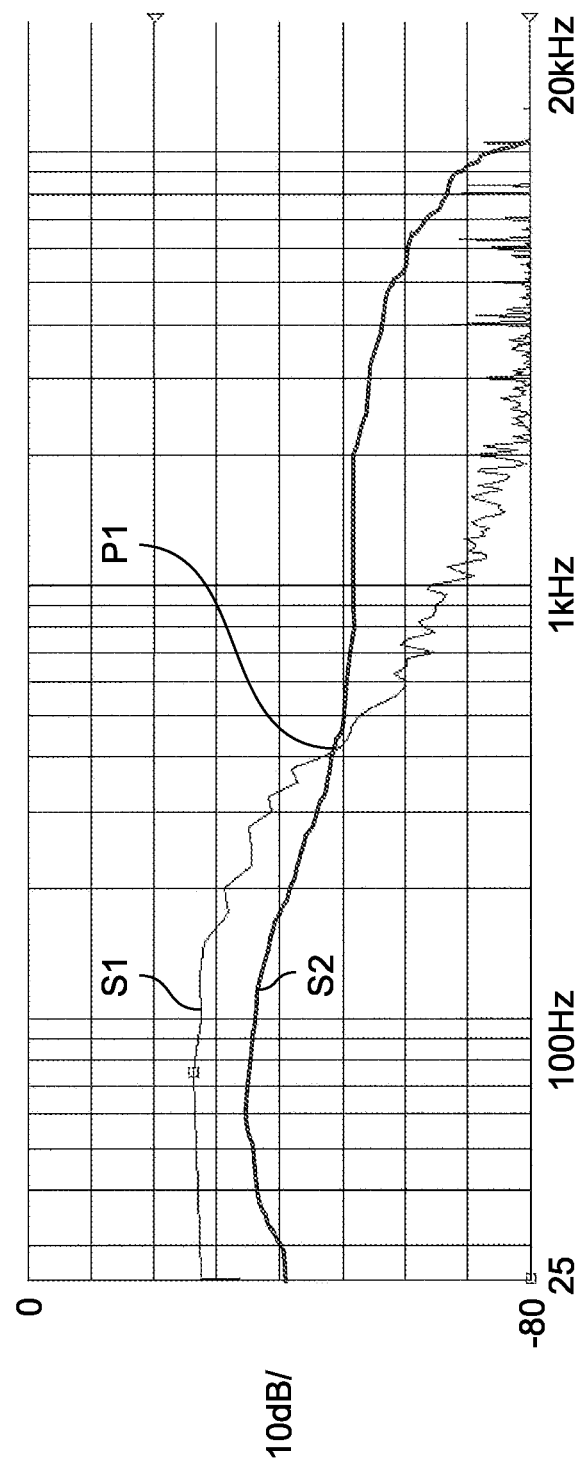
FIG. 4 is a graph showing the frequency distributions of a noise signal S1 and a content voice signal S2.

The graph of FIG. 4 shows the frequency distributions of noise signal S1 and content voice signal S2. As shown in FIG. 4, noise signal S1 has a characteristic that the sound pressure level in the low frequency range is high and the sound pressure level in the high frequency range is low. Sound leakage occurs in the frequency band in which the sound pressure level of content voice signal S2 exceeds the sound pressure level of noise signal S1. In noise signal S1, the sound pressure level is reduced to some extent by the output of the control sound for noise reduction, but the noise in the low frequency range is large. Therefore, even if noise signal S1 is reduced by the control sound, it is considered that noise signal S1 is not lower than the sound pressure level of content voice signal S2 in the low frequency band. On the other hand, noise signal S1 is lower than the sound pressure level of content voice signal S2 in the high frequency band. Therefore, even in a noisy environment, when user U listens to the content voice without headphones or earphones, sound leakage occurs in the high frequency range of the voice. In particular, as shown in FIG. 3, when the target spaces for voice control are disposed next to each other, sound leaks to the adjacent aisles and seats. Such sound leakage is annoying to other users U, and hinders the operation of the aircraft.

Further, control sound speaker 51 is a speaker suitable for outputting a control sound that reduces noise, that is, for outputting a low frequency signal. Therefore, control sound speaker 51 is not particularly suitable for the output of content voice signal S2 having large high frequency signals.

In the voice control device, the voice control system, or the voice control method according to the first exemplary embodiment, the output of the sound source signal is divided according to the frequency band, and divided signals are output from two different speakers. This implements an environment in which user U can enjoy viewing the content in shell structure 110 without using headphones or earphones.

Hereinafter, the configuration and operation of the voice control device, the voice control system, and the voice control method will be described by providing the speaker for the high frequency range according to the first exemplary embodiment.

1-1. Configuration

1-1-1. Configuration Of Voice Control System 1 And Voice Control Device 10

Figure 5:
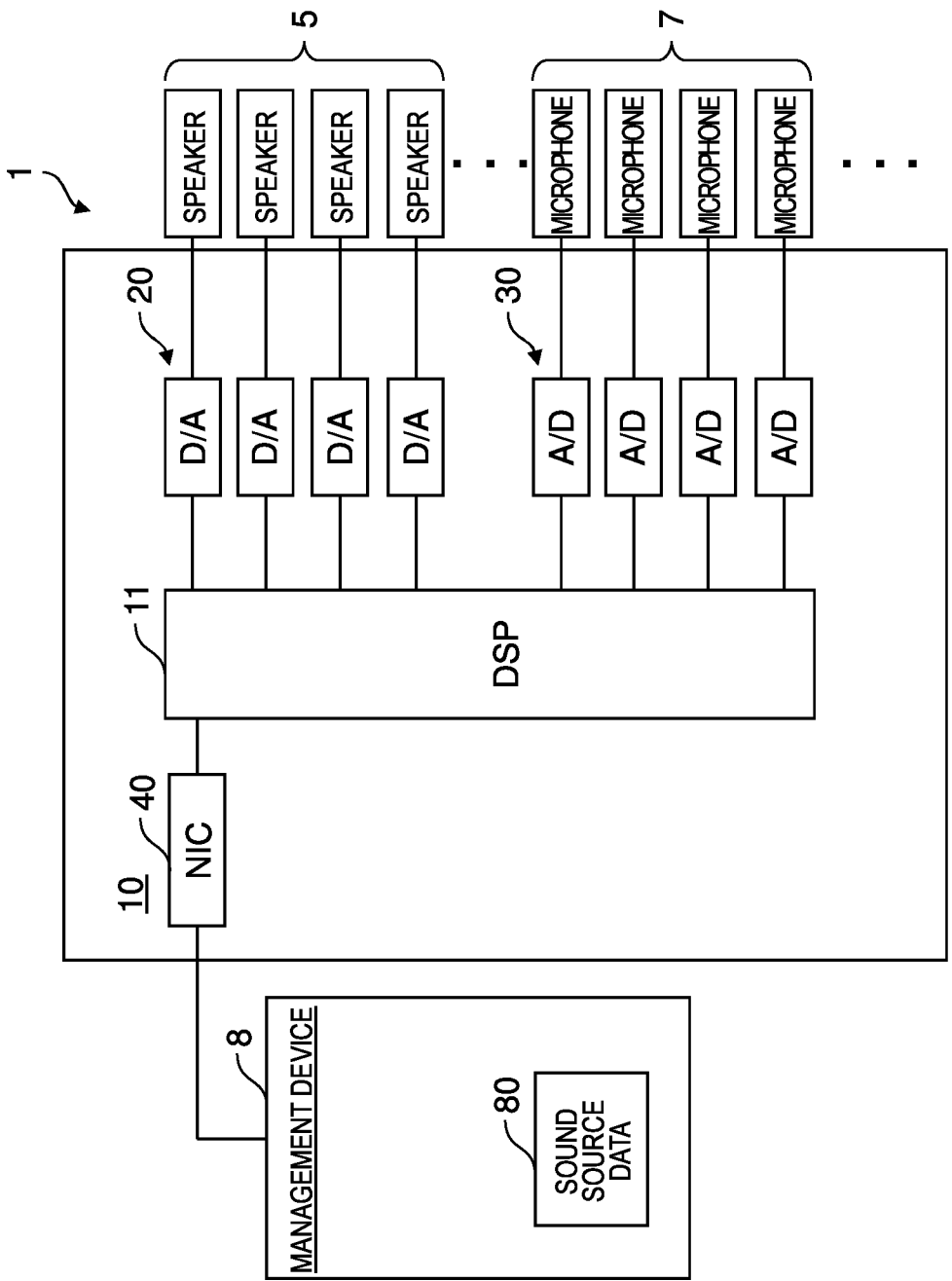
FIG. 5 shows a basic configuration of the voice control system.

FIG. 5 shows the basic configuration of voice control system 1. Voice control system 1 is disposed in the space of each seat. Voice control system 1 includes voice control device 10, speaker group 5, and microphones group 7.

Voice control device 10 includes Digital Signal Processor (DSP) 11, D/A converter group 20, A/D converter group 30, and network card (MC) 40. DSP 11 includes a circuit and a memory for executing voice control including noise reduction control as described later. Each D/A converter (an example of the voice output unit) of D/A converter group 20 is connected to each speaker. Each D/A converter converts the voice signal and the control sound signal generated by DSP 11 from a digital signal to an analog signal and outputs the converted signal to the speaker. Each A/D converter (an example of a sound collection signal input unit) of A/D converter group 30 is connected to each microphone. Each A/D converter converts the voice collected by the microphone from an analog signal to a digital signal and inputs the converted signal to DSP 11. Network card 40 (an example of a sound source signal input unit) includes a circuit or a terminal for communicating with management device 8. Network card 40 receives sound source data 80 of the content from management device 8.

Figure 6:
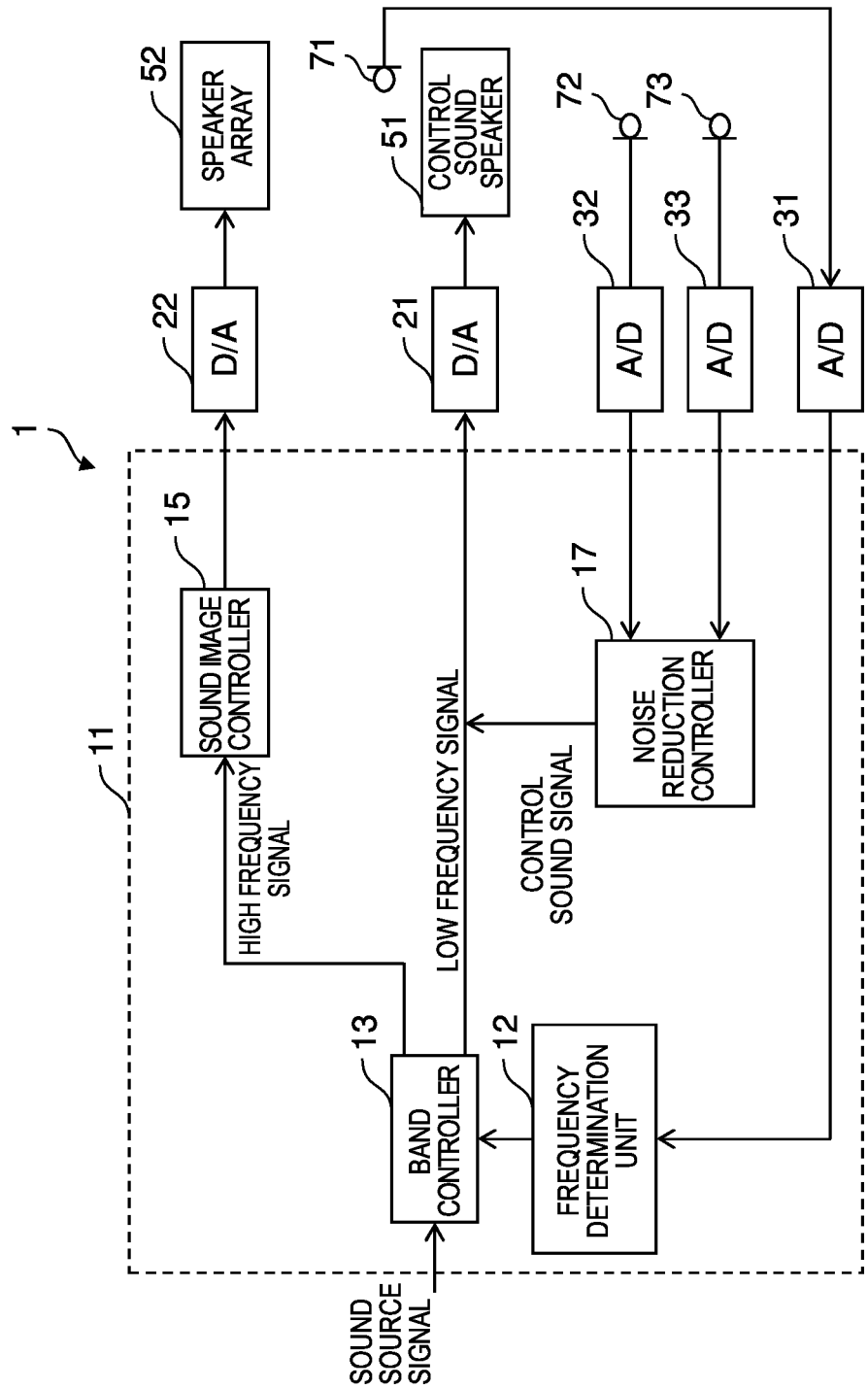
FIG. 6 shows the configuration of a voice control system according to a first exemplary embodiment.

Speaker group 5 includes control sound speaker 51 and speaker array 52 shown in FIG. 6. Control sound speaker 51 is a speaker designed to be suitable for outputting a low frequency signal. As will be described later, control sound speaker 51 amplifies and outputs the control sound signal output from noise reduction controller 17. The control sound is a voice signal generated to offset the noise. Control sound speaker 51 also amplifies and outputs the low frequency signal of the sound source signal, as will be described later. Speaker array 52 is a speaker suitable for high-pitched sound output, and includes a plurality of speakers disposed in a row. As will be described later, speaker array 52 amplifies and outputs a high frequency sound signal such that the sound power is concentrated in the vicinity of a control point on the head of user U, by a wave field synthesis technique.

As shown in FIG. 6, microphone group 7 include content voice detection microphone 71, noise microphone 72, and error microphone 73.

Content voice detection microphone 71 is a microphone for detecting a content reproduction signal output in the space of shell structure 110, and collects sounds around the microphone. The voice signal collected by content voice detection microphone 71 is input to frequency determination unit 12 of DSP 11 via corresponding A/D converter 31.

Noise microphone 72 is a microphone for detecting the sound emitted from the noise source, and collects the sound around the microphone. The voice signal collected by noise microphone 72 is input to noise reduction controller 17 of DSP 11 via corresponding A/D converter 32.

Error microphone 73 is a microphone for detecting residual sound (error sound) as a result of overlapping the sound emitted from the noise source and the control sound emitted from control sound speaker 51. Error microphone 73 is disposed near the head of user U, which is a control point. A plurality of content voice detection microphones 71, a plurality of noise microphones 72, and a plurality of error microphones 73 may be provided.

As shown in FIG. 5, the voice controller system may be connected to management device 8 of aircraft 100. Management device 8 includes a processor including a control circuit such as a CPU and a memory, and includes a computer that operates according to a predetermined program. Management device 8 stores sound source data 80 of the content. Sound source data 80 of the content includes sound source data of the content that can be viewed by user U as desired, such as a voice of music, a movie, a television, a radio, or the like.

By executing a predetermined program, DSP 11 executes the functions of frequency determination unit 12, band controller 13, sound image controller 15, and noise reduction controller 17 shown in FIG. 6.

Frequency determination unit 12 determines the cutoff frequency based on the content reproduction signal and the noise signal. Specifically, frequency determination unit 12 acquires the content reproduction signal collected by content voice detection microphone 71. The sound collection signal collected by content voice detection microphone 71 also includes a noise signal. The frequency determination unit acquires, for example, the frequency characteristics of the content reproduction signal as shown in FIG. 4, by removing the noise signal in shell structure 110, from the sound collection signal. The noise signal in shell structure 110 may be measured in advance and stored in a memory, when the content reproduction signal is not output from the speaker. The noise signal has frequency characteristics similar to those of noise signal S1 shown in FIG. 4, that is, the lower the frequency, the higher the sound pressure level. Frequency determination unit 12 determines the cutoff frequency at which the sound pressure level of the content reproduction signal becomes equal to or higher than the sound pressure level of the noise signal, from the frequency characteristics of the content reproduction signal and the frequency characteristics of the noise signal acquired from content voice detection microphone 71. The cutoff frequency is, for example, the frequency indicated by P1 shown in FIG. 4.

The cutoff frequency changes according to changes in the sound pressure level and frequency characteristics of the content reproduction signal collected by content voice detection microphone 71. Therefore, frequency determination unit 12 monitors such a change, and changes the cutoff frequency when the change occurs.

Frequency determination unit 12 may make a determination according to the number of speakers in speaker array 52, at least in the initial state. Further, content voice detection microphone 71 may be disposed in the vicinity of control sound speaker 51, and determine the cutoff frequency according to the frequency band of the low frequency signal output from control sound speaker 51.

Band controller 13 acquires the sound source signal of the content, from sound source data 80. Band controller 13 includes filter circuits such as a Low Pass Filter (LPF), a High Pass Filter (HPF), and a Band Pass Filter (BPF), and divides a sound source signal into two band signals, according to the cutoff frequency determined by frequency determination unit 12. Specifically, band controller 13 acquires a high frequency signal in a frequency band equal to or higher than the cutoff frequency and a low frequency signal in a frequency band equal to or lower than the cutoff frequency, from the sound source signal. The high frequency signal is input to sound image controller 15. The low frequency signal is output to control sound speaker 51 together with the control sound signal output from noise reduction controller 17.

The frequency band equal to or higher than the cutoff frequency includes both the case where the cutoff frequency is included and the case where the cutoff frequency is not included. Similarly, the frequency band equal to or lower than the cutoff frequency includes both the case where the cutoff frequency is included and the case where the cutoff frequency is not included.

Figure 7:
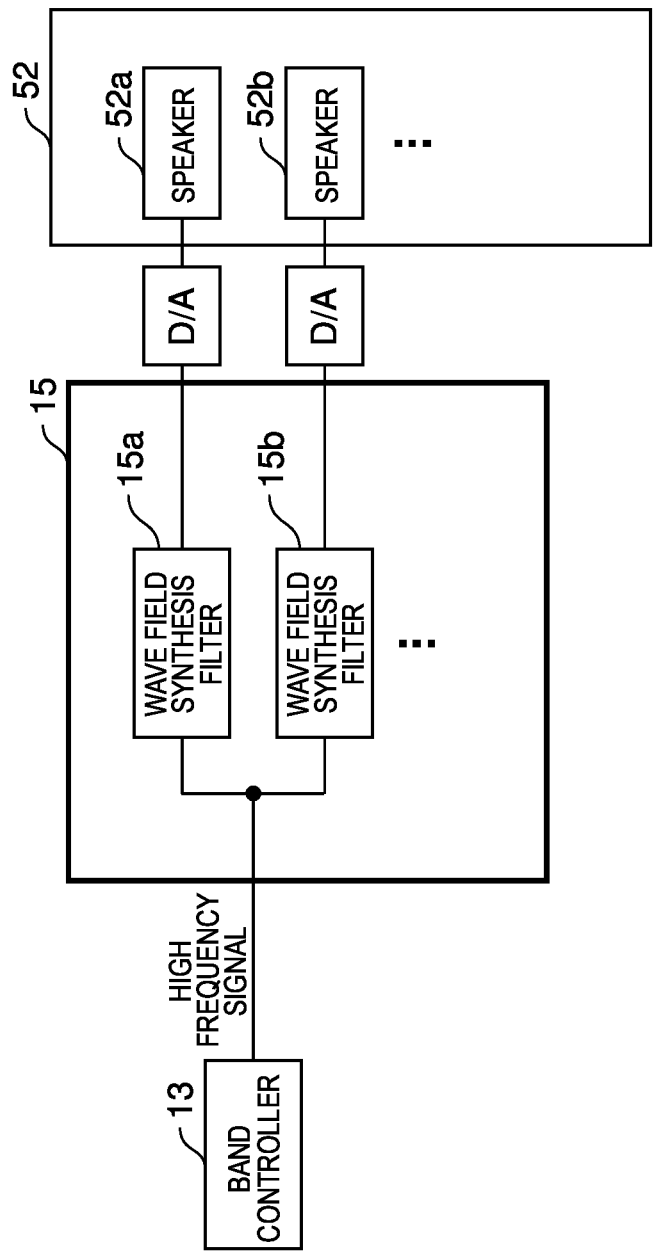
FIG. 7 shows a configuration of a sound image controller according to the first exemplary embodiment.

Sound image controller 15 performs a wave field synthesis process for controlling at least one of the phase and the sound pressure level of the acquired high frequency signal such that the sound image is localized at the control point near the head of user U. As shown in FIG. 7, sound image controller 15 includes a plurality of wave field synthesis filters 15a, 15b, . . . , which are digital filters. Wave field synthesis filters 15a, 15b, correspond to speakers 52a, 52b, . . . of speaker array 52, respectively, and form a plurality of channels (for example, 16 channels). For each of wave field synthesis filters 15a, 15b, . . . , filter coefficients are set according to the distance between the control point near the head of user U in shell structure 110 and speaker array 52. By convolving the filter coefficient, the output from speaker array 52 is controlled to concentrate the power of the high frequency sound signal output in the vicinity of the designated control point. Thus, even if the sound pressure level is reduced, user U can sufficiently hear the voice signals from speakers 52a, 52b, . . . of speaker array 52.

Figure 8:
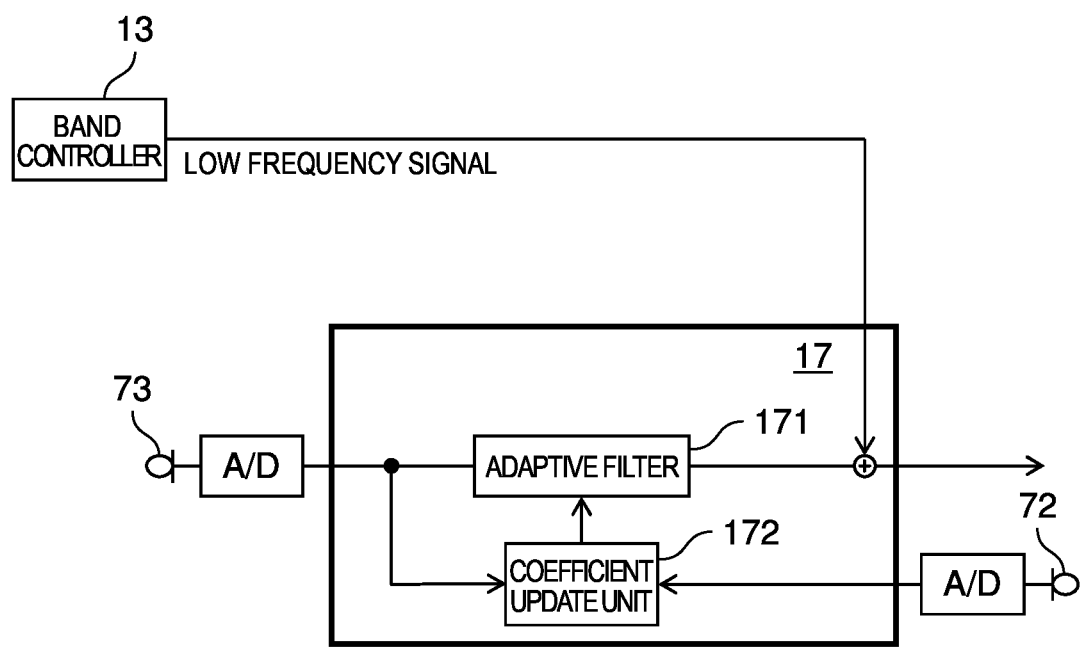
FIG. 8 shows a configuration of a noise reduction controller according to the first exemplary embodiment.

Noise reduction controller 17 generates a control sound signal for reducing the noise signal, and outputs the control sound signal to control sound speaker 51 via D/A converter 21. As shown in FIG. 8, noise reduction controller 17 includes adaptive filter 171, and coefficient update unit 172.

Adaptive filter 171 is a circuit that generates a control sound signal that reduces noise. Adaptive filter 171 is, for example, a Finite Impulse Response (FIR) filter that is composed of multi-stage taps and can freely set the filter coefficient of each tap.

Coefficient update unit 172 is implemented by a predetermined algorithm (for example, Least Mean Square (LMS)) executed by the processor. Coefficient update unit 172 acquires the error sound from error microphone 73 in addition to the noise input from noise microphone 72. Coefficient update unit 172 updates the transfer function and adjusts each filter coefficient of adaptive filter 171 such that this error sound is minimized. Thus, a control sound signal having a phase opposite to the noise from the noise source is generated at the control point near the installation position of error microphone 73. The generated control sound signal is output to control sound speaker 51 via D/A converter together with the low frequency signal of the sound source signal of the content described above.

1-1-2. Arrangement Example Of Microphone And Speaker

Figure 9:
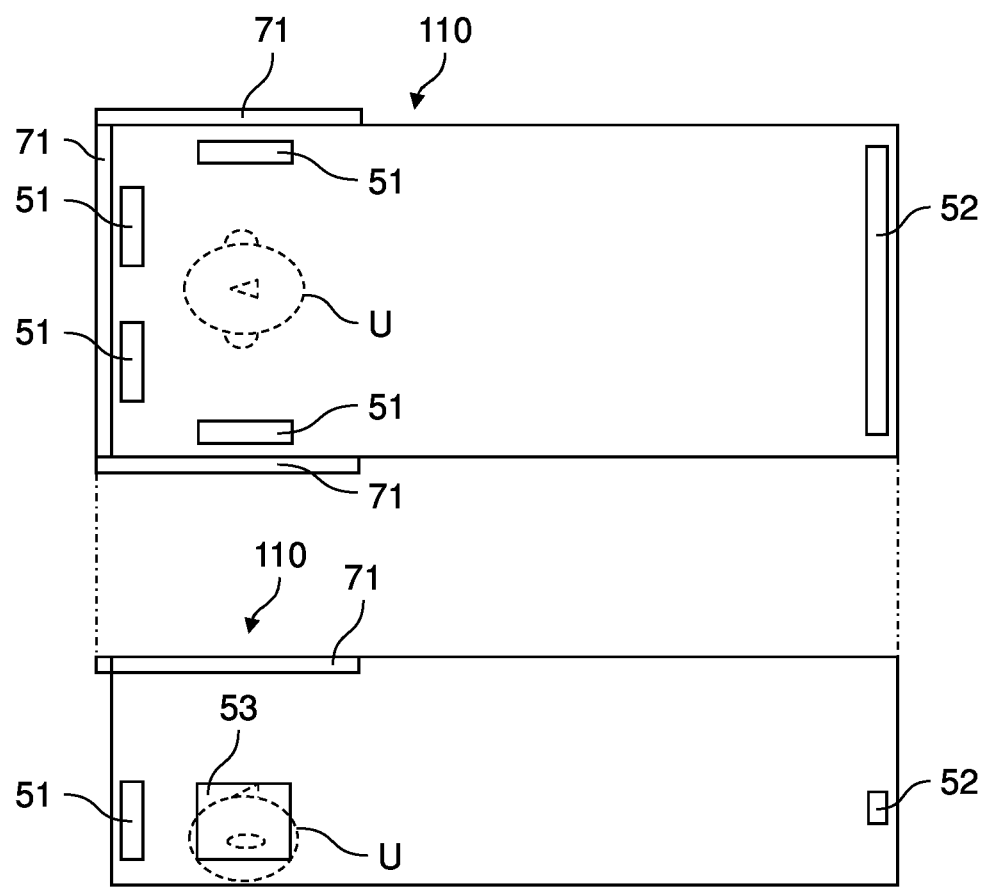
FIG. 9 shows an arrangement example of a speaker and a microphone according to the first exemplary embodiment.
Figure 10:
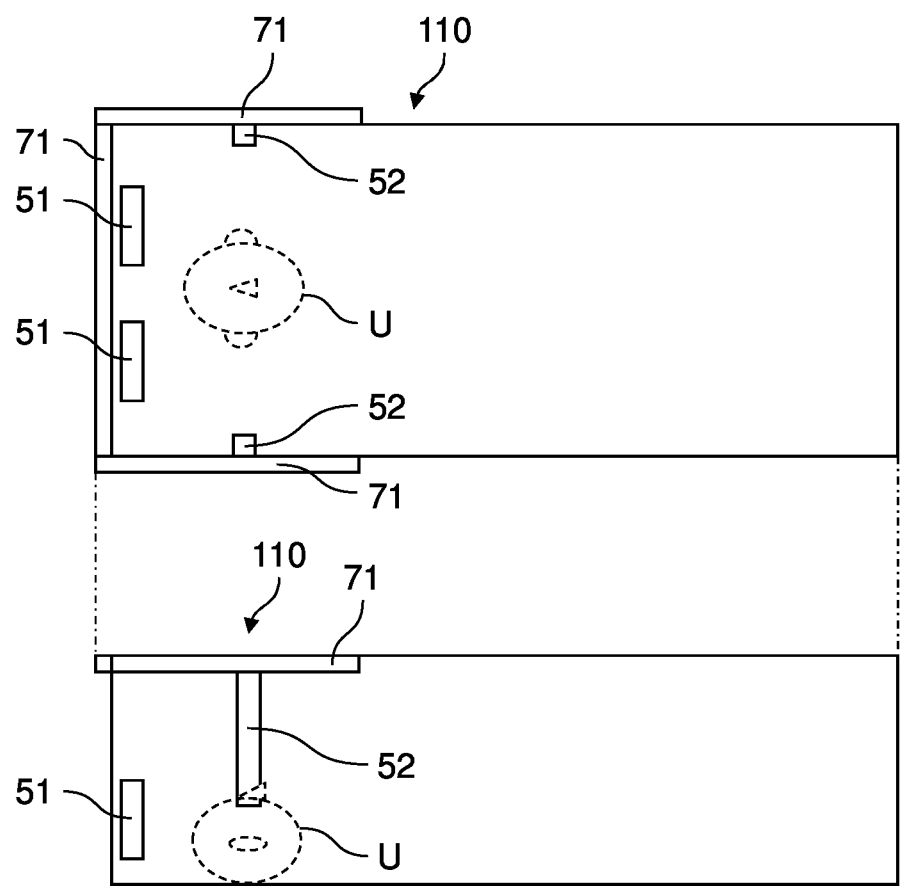
FIG. 10 shows another arrangement example of the speaker and the microphone according to the first exemplary embodiment.

FIGS. 9 and 10 show an arrangement example of the microphone and the speaker according to the first exemplary embodiment. In FIGS. 9 and 10, the upper view is a plan view, and the lower view is an elevation view corresponding to the plan view. User U is lying in shell structure 110.

In the example shown in FIG. 9, control sound speaker 51 is disposed at a control point near the head of user U. Since control sound speaker 51 outputs a control sound that reduces noise, it is desirable that control sound speaker 51 is disposed near the control point. On the other hand, speaker array 52 is disposed at a position away from the control point (for example, the wall in front of the foot side of user U). As described above, the sound image of the voice signal output from speaker array 52 is localized in the vicinity of the control point, by the wave field synthesis process by sound image controller 15. Therefore, even if the output of each speaker of speaker array 52 is small, it is possible to provide user U with a sufficiently audible volume. Further, since speaker array 52 can reduce the sound output, the risk of sound leakage can be reduced. Content voice detection microphone 71 is disposed above and close to the control point in shell structure 110.

The arrangement of speaker array 52 is not limited to the arrangement shown in FIG. 9. For example, as shown in FIG. 10, speaker array 52 may be disposed near the control point. In FIG. 10, the longitudinal direction of speaker array 52 is disposed vertically with respect to the floor surface of seat shell structure 110. Such an arrangement has an effect of facilitating the wave field synthesis of the voice signal output from each speaker configuring speaker array 52 such that the sound emitted by speaker array 52 has a directivity so as to be prevented from leaking to the outside of the shell beyond the edge of shell structure 110.

Although FIG. 9 shows an example in which speaker array 52 is disposed such that longitudinal direction is perpendicular to the floor surface, it is not always necessary to arrange speaker array 52 strictly perpendicular to the floor surface. The same effect can be obtained even if the longitudinal direction of speaker array 52 is deviated from the vertical direction and slanted.

Further, when the direction of the edge of shell structure 110 is, for example, the horizontal direction or the vertical direction, speaker array 52 may be disposed such that the longitudinal direction of speaker array 52 is perpendicular to the edge direction of shell structure 110. Further, the intervals between the individual speakers of speaker array 52 may be irregular or uniform. When the surface of shell structure 110 is a curved structure, the speakers may be disposed side by side along the surface of the curved structure such that the distance between the individual speakers is substantially uniform.

That is, when the speakers configuring speaker array 52 are disposed such that the vertical distances from the floor surface to the installation locations are all different, the effects described above can be obtained.

Further, in the arrangement example of the microphone and the speaker according to the first exemplary embodiment, content voice detection microphone 71 is provided independently, but it is not always necessary to provide a dedicated microphone for detecting the content reproduction signal. Even if each noise microphone and error microphone installed in shell structure 110 share functions and are used as content voice detection microphone 71, a certain effect can be obtained.

1-2. Operation

The operation of voice control device 10 will be mainly described with reference to FIG. 11. User U requests the distribution of the sound source data by operating the remote controller or the touch panel installed in seat 105. Thus, the sound source signal is received (S101). Further, the sound collection signal collected by content voice detection microphone 71 is received (S102). The noise reduction control by noise reduction controller 17 is executed in parallel.

Frequency determination unit 12 acquires a content reproduction signal from the sound collection signal collected by content voice detection microphone 71, and determines the cutoff frequency, based on the content reproduction signal and the noise signal (S103). Band controller 13 acquires a high frequency signal in a frequency band equal to or higher than the cutoff frequency and a low frequency signal in a frequency band equal to or lower than the cutoff frequency, from the sound source signal (S104).

The high frequency signal is subjected to a wave field synthesis process by sound image controller 15 (S105). The high frequency signal subjected to the wave field synthesis process is output to speaker array 52 (S106). On the other hand, the low frequency signal is output to control sound speaker 51 together with the control sound signal generated by noise reduction controller 17 (S107).

When an end condition such as stop of the transmission of the sound source signal occurs, the process ends (S108). On the other hand, when the end condition does not occur, frequency determination unit 12 continues to monitor changes in the sound pressure level and frequency characteristics of the content reproduction signal collected by content voice detection microphone 71. Frequency determination unit 12 repeats the operations of steps S102 to S108, according to the change.

By the above operation, the sound pressure level of the content reproduction signal can be controlled so as not to exceed the sound pressure level of the noise signal. Therefore, user U can enjoy the sound without headphones or earphones, while preventing the sound from leaking from shell structure 110 to the outside.

1-3. Modification Example

Figure 12:
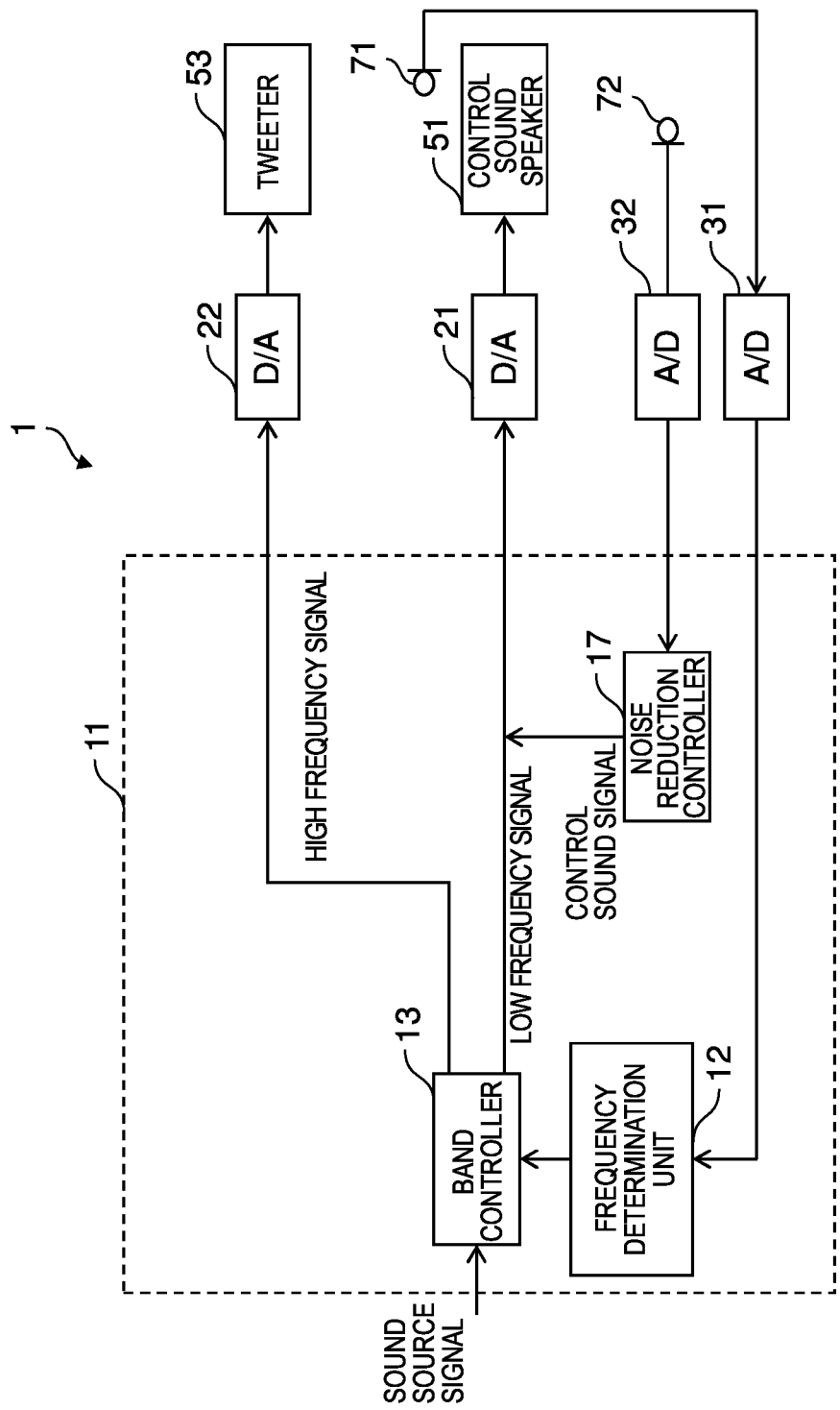
FIG. 12 shows a configuration of a voice control system according to a modification example of the first exemplary embodiment.
Figure 13:
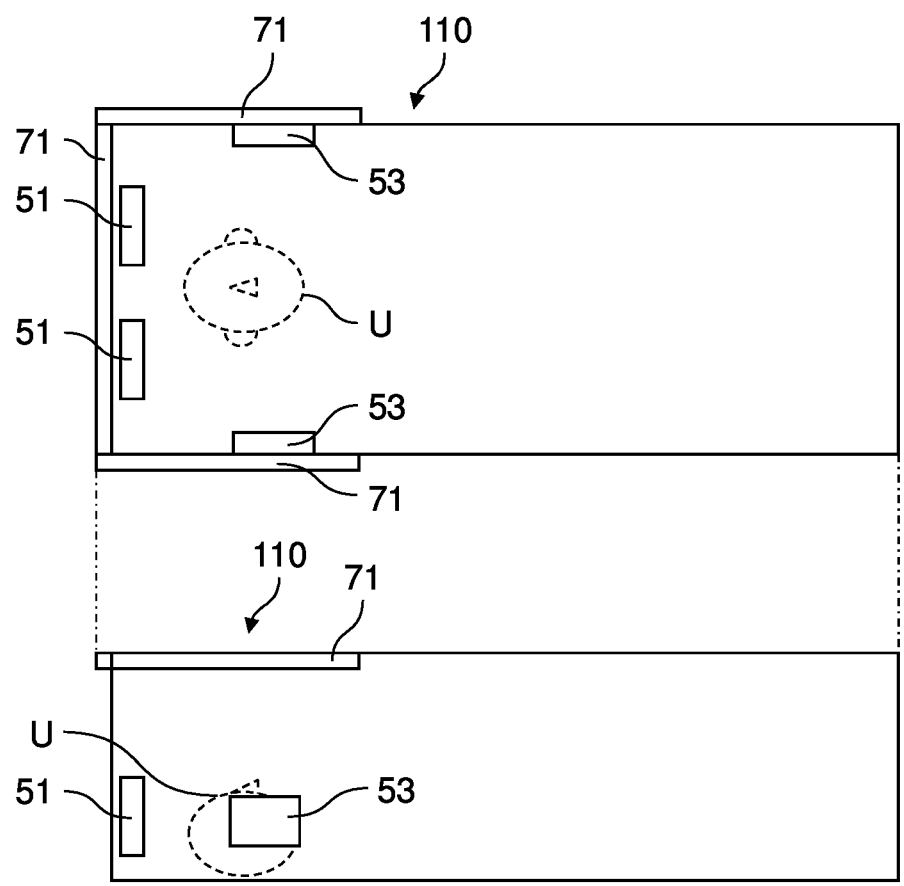
FIG. 13 shows an arrangement example of a speaker and a microphone according to the modification example.

FIG. 12 shows a configuration of voice control system 1 according to a modification example of the first exemplary embodiment. In the same modification example, tweeter 53 is provided instead of speaker array 52, and sound image controller 15 is not provided. Tweeter 53 is a speaker suitable for high-pitched sound output. The high frequency signal divided by band controller 13 is output to tweeter 53 via D/A converter 22. As shown in FIG. 13, which is a diagram similar to FIGS. 9 and 10, tweeter 53 is disposed on the left and right in the vicinity of the control point. Thus, user U can sufficiently hear the output sound even if the output is small, and can reduce the risk of sound leakage.

Figure 14:
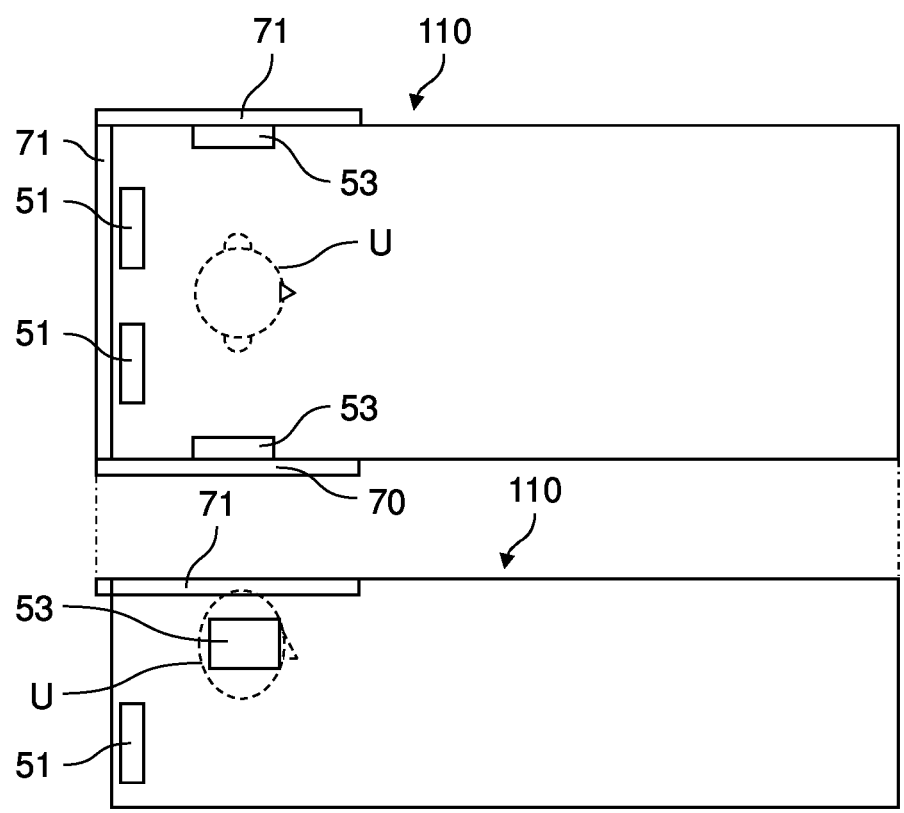
FIG. 14 shows another arrangement example of the speaker and the microphone according to the modification example.

In FIG. 13, tweeter 53 is disposed below shell structure 110 in accordance with the state in which user U is lying in shell structure 110. On the other hand, when it is assumed that user U hears the sound in a sitting posture, tweeter 53 may be disposed above shell structure 110 as shown in FIG. 14.

1-4. Features, and the like

In voice control system 1, voice control device 10, or the voice control method according to the first exemplary embodiment, the cutoff frequency is determined based on the content reproduction signal output from the speaker and the noise signal, the sound source signal of the content is divided into a high frequency signal in a frequency band equal to or higher than the cutoff frequency and a low frequency signal in a frequency band equal to or lower than the cutoff frequency, the low frequency signal is output to control sound speaker 51 that outputs a control sound signal for noise reduction, and the high frequency signal is output to speaker array 52.

The high frequency signal that causes sound leakage to the outside of shell structure 110 is subjected to the wave field synthesis process and output from speaker array 52. Thus, it is possible to prevent sound leakage while providing a sound having a sufficient sound pressure level with a small output level to the control point near the head of user U, for the high frequency signal. On the other hand, for the low frequency signal that is relatively unsuitable for speaker array 52, control sound speaker 51 that is provided for noise reduction and is suitable for the low frequency signal is used. Thus, while preventing sound leakage, it is possible to complement the sounds in different frequency bands with each other by control sound speaker 51 and speaker array 52, and it becomes possible to reproduce the sound of content in a wide band near the head of user U. Therefore, user U can view the content without using headphones or earphones.

In addition, by monitoring the changing cutoff frequency, the cutoff frequency is changed according to changes in the content and noise signal, and the voice can be controlled such that the sound pressure level of the high frequency signal does not exceed the sound pressure level of the noise signal. Therefore, sound leakage can be prevented more reliably.

Further, since the noise reduction operation can be executed in parallel, the sound of the content can be reproduced while reducing the noise.

2. Second Exemplary Embodiment

Figure 15:
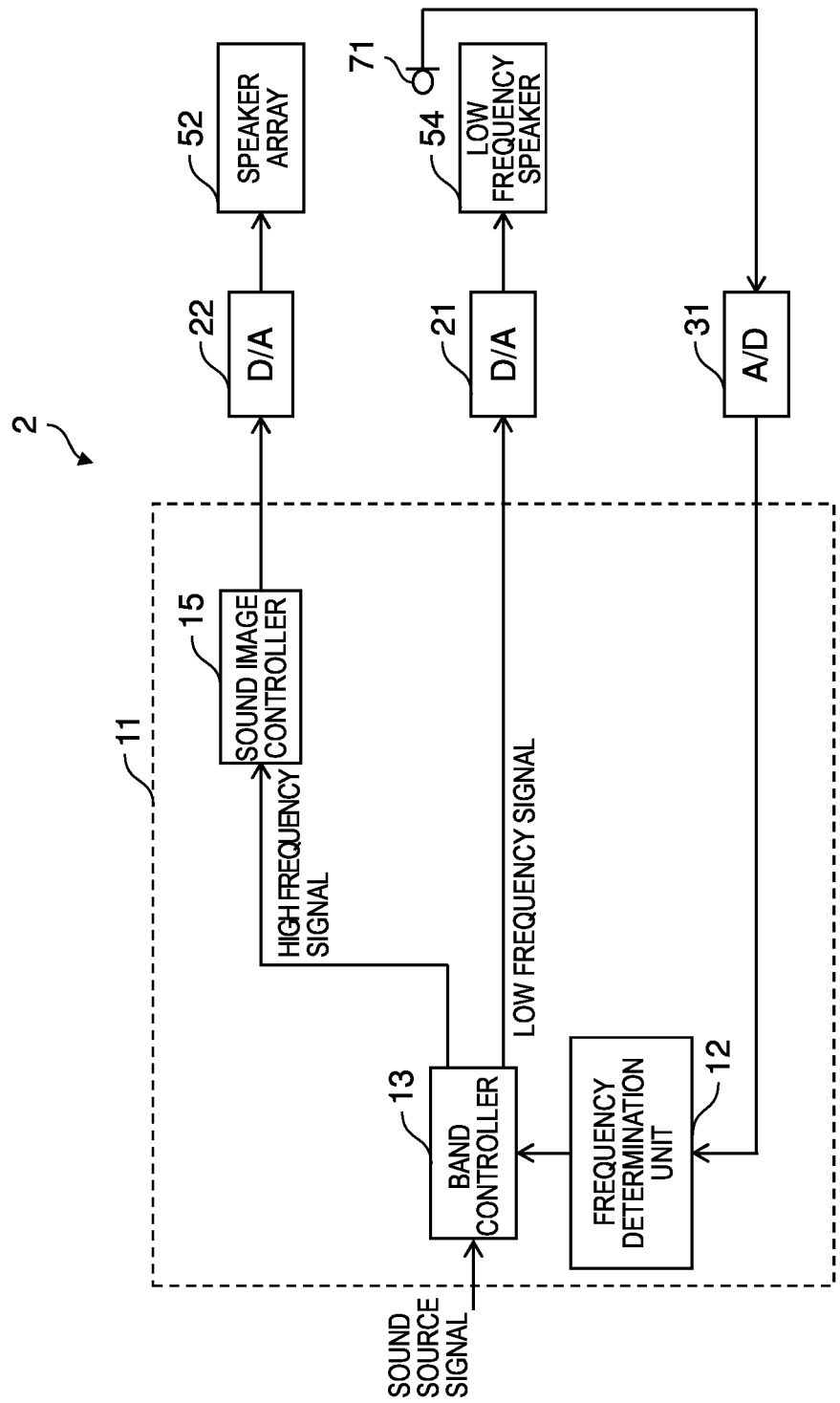
FIG. 15 shows the configuration of the voice control system according to a second exemplary embodiment.

Voice control system 2 according to a second exemplary embodiment will be described with reference to FIG. 15. The same configurations and functions as those in the first exemplary embodiment are designated by the same reference numerals, and the description thereof will be omitted.

Voice control system 2 according to the second exemplary embodiment is different from voice control system 1 according to the first exemplary embodiment in that it does not have noise reduction controller 17. The low frequency signal of the sound source signal acquired by band controller 13 is output to low frequency speaker 54 via the D/A converter. Low frequency speaker 54 may be a speaker having the same configuration and function as control sound speaker 51.

As described above, voice control system 2 according to the second exemplary embodiment has the same effect as that of the first exemplary embodiment except for the noise reduction effect even when the noise reduction process is not executed. That is, while preventing sound leakage, it is possible to complement the sounds in different frequency bands with each other by low frequency speaker 54 and speaker array 52, and it becomes possible to reproduce the sound of content in a wide band near the head of user U. User U can view the content without using headphones or earphones.

In voice control system 2, tweeter 53 (FIG. 12) may be provided instead of speaker array 52, and sound image controller 15 may not be provided, as in the first exemplary embodiment.

3. Third Exemplary Embodiment

Figure 17:
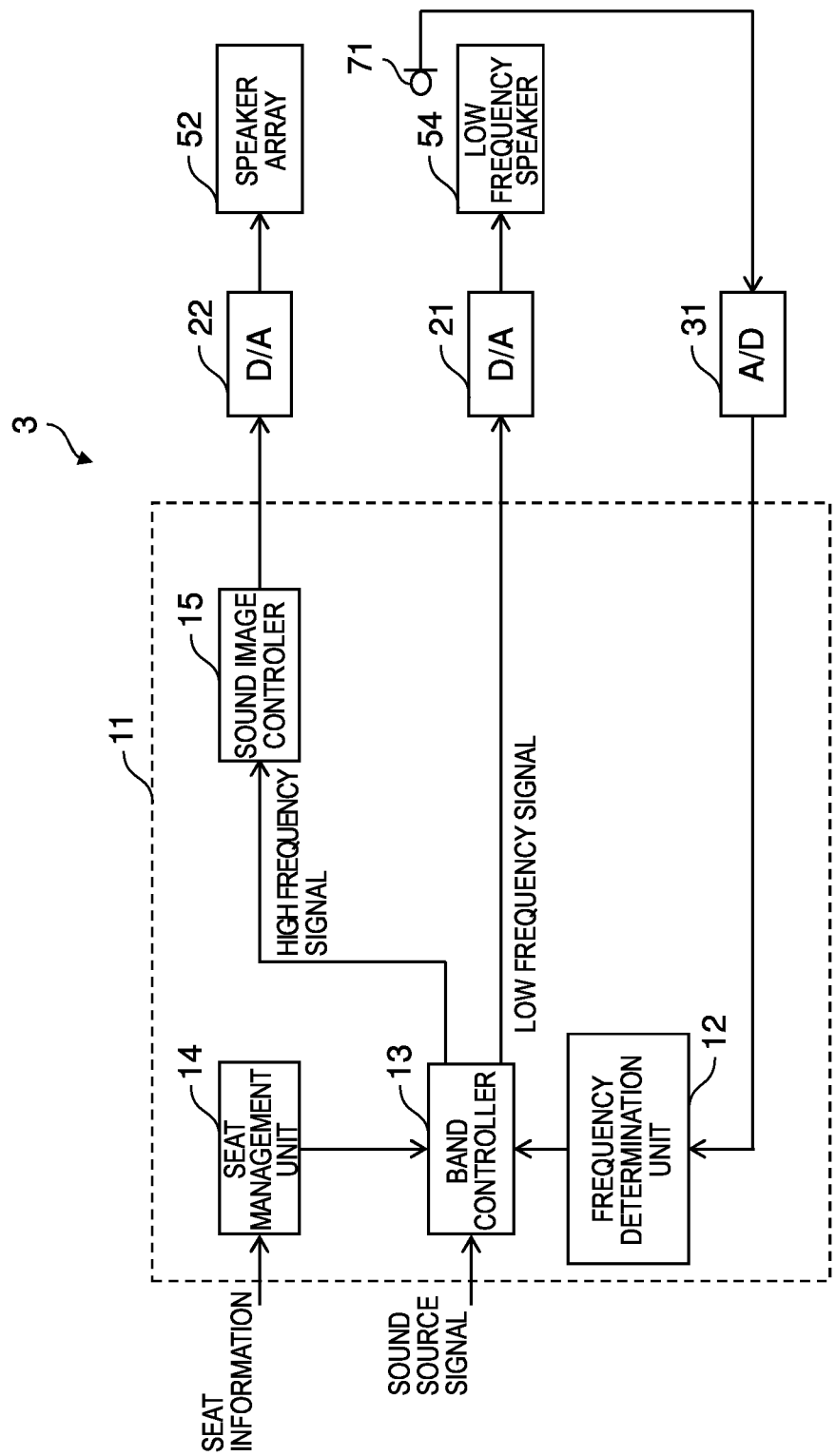
FIG. 17 shows the configuration of a voice control system according to a third exemplary embodiment.

A voice control system 3 according to a third exemplary embodiment will be described with reference to FIG. 17. The same configurations and functions as those of the first exemplary embodiment and the second exemplary embodiment are designated by the same reference numerals, and the description thereof will be omitted.

Voice control system 3 according to the third exemplary embodiment is different from voice control system 1 according to the first exemplary embodiment in that it does not have noise reduction controller 17 and has seat management unit 14. The low frequency signal of the sound source signal acquired by band controller 13 is output to low frequency speaker 54 via the D/A converter.

In the first exemplary embodiment, frequency determination unit 12 determines the cutoff frequency, based on the content reproduction signal and the noise signal, but in the third exemplary embodiment, a different method is used to determine the cutoff frequency. Frequency determination unit 12 stores a cutoff frequency that is determined in advance so as to enable wide band reproduction by complementing each other, based on the reproduction frequency band of speaker array 52 and the reproduction frequency band of low frequency speaker 54. For these reproduction frequency bands, it is conceivable to use the nominal specifications of each speaker, or actual measurement values and simulation values in the actual usage environment of the system.

Frequency determination unit 12 determines the cutoff frequency by using the cutoff frequency stored in advance.

Frequency determination unit 12 may use the predetermined cutoff frequency in a fixed manner, or may determine the cutoff frequency according to the characteristics of the content and the settings of the system at the time of content reproduction.

Band controller 13 adjusts the sound pressure level of the high frequency signal output from speaker array 52 and the sound pressure level of the low frequency signal output from low frequency speaker 54, so that the high frequency range and the low frequency range that user U views can be balanced. The sound pressure level of the low frequency signal and the sound pressure level of the high frequency signal are adjusted according to the seat information such as the bed state, the reclining state, and the like acquired by seat management unit 14, so that it is possible to construct a good sound environment according to the head position of user U in the bed state shown in FIG. 18 and the head position of user U in the reclining state shown in FIG. 19. Low frequency speaker 54 may be a speaker having the same configuration and function as control sound speaker 51 described in the first exemplary embodiment.

Arrangement Example of Microphone and Speaker

Figure 18:
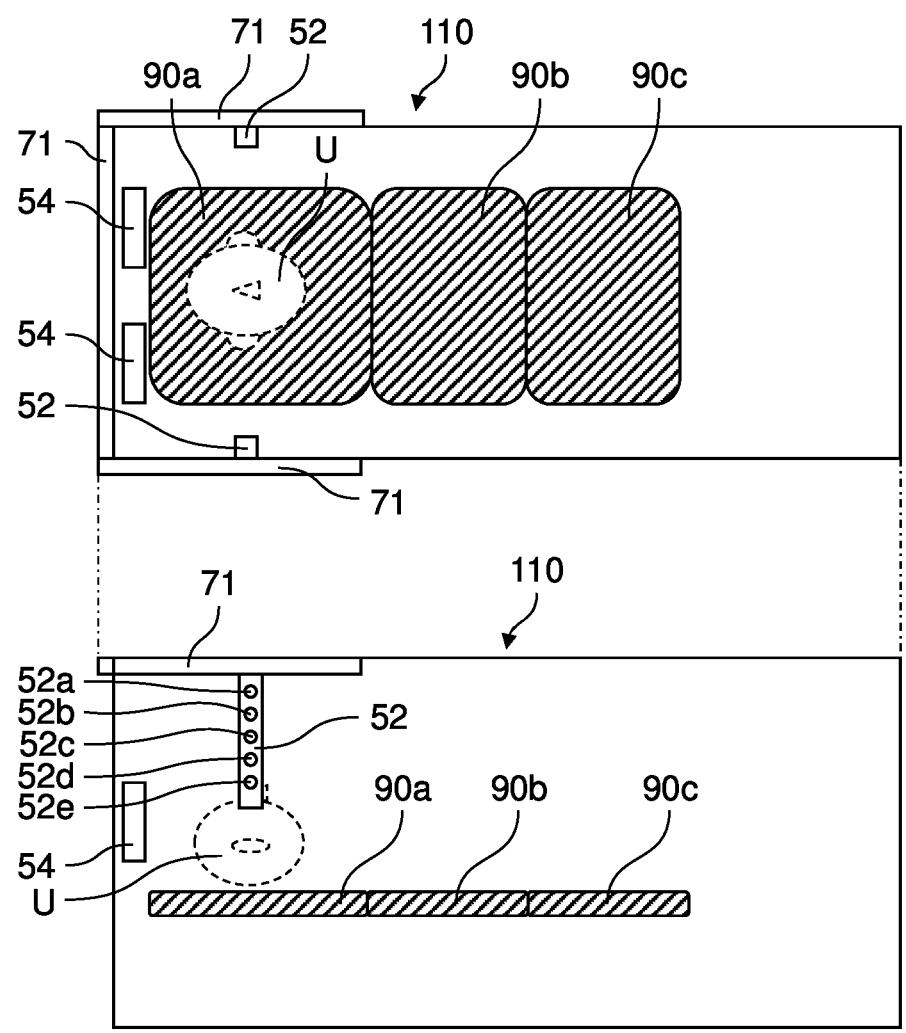
FIG. 18 shows an arrangement example of a speaker and a microphone according to the modification example.
Figure 19:
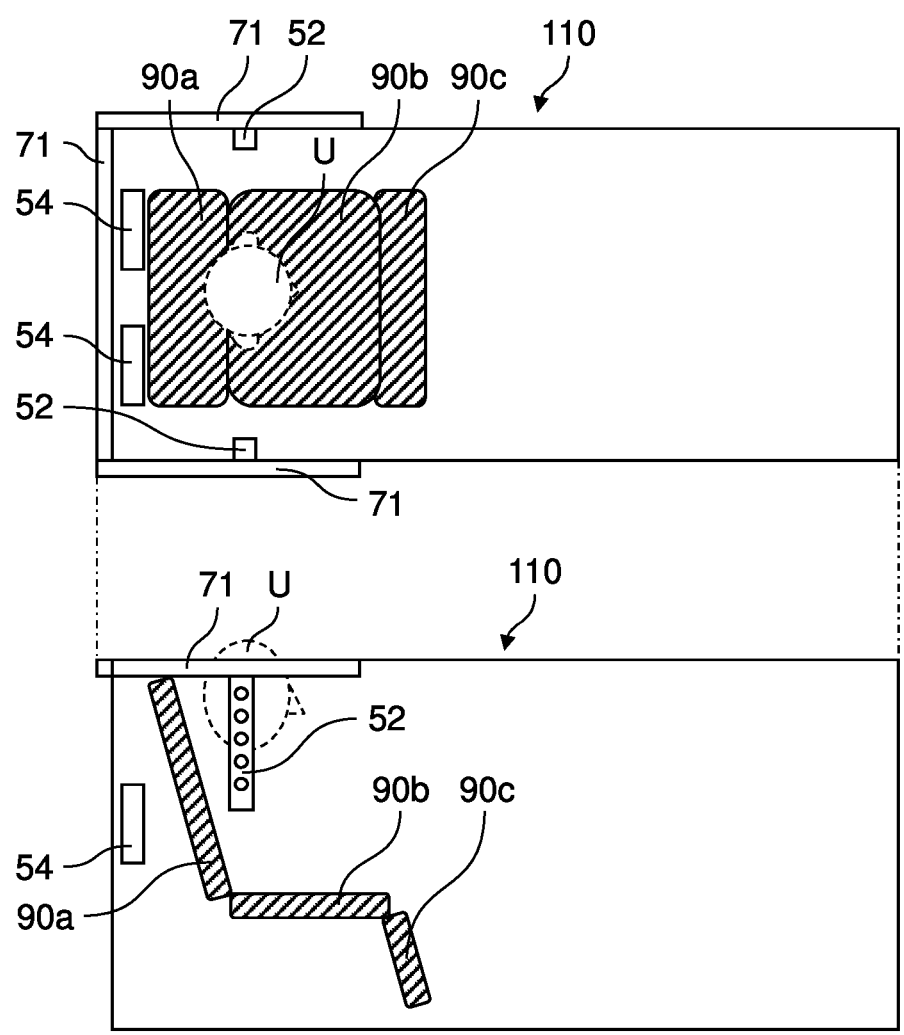
FIG. 19 shows another arrangement example of the speaker and the microphone according to the modification example.

FIGS. 18 and 19 show an arrangement example of the microphone and the speaker according to the third exemplary embodiment. In FIGS. 18 and 19, the upper view is a plan view, and the lower view is an elevation view corresponding to the plan view. User U in FIG. 18 is lying in shell structure 110. Back cushion 90*a*, seat cushion 90*b*, and leg cushion 90*c* are lined up almost flat to be in a bed state. User U in FIG. 19 is sitting in a chair in shell structure 110. Back cushion 90*a*, seat cushion 90*b*, and leg cushion 90*c* are disposed at different angles to be in a reclining state. User U operates the positions and angles of back cushion 90*a*, seat cushion 90*b*, and leg cushion 90*c* by using the seat operation panel provided on the seat wall, the armrest, and the like, so that the seat state such as the bed state of FIG. 18, the reclining state of FIG. 19, and the intermediate state thereof can be changed.

In the example shown in FIG. 18, low frequency speaker 54 is disposed near the head of user U on shell structure 110. In the example shown in FIG. 19, low frequency speaker 54 is not disposed near the head of user U. On the other hand, speaker array 52 is disposed near the head of user U on shell structure 110. As described above, the sound image of the voice signal output from speaker array 52 is localized in the vicinity of the head of user U, by the wave field synthesis process by sound image controller 15. Therefore, even if the output of each speaker of speaker array 52 is small, it is possible to provide user U with a sufficiently audible volume. Further, since speaker array 52 can reduce the sound output in locations other than the location where the sound image is localized by the wave field synthesis process, the risk of sound leakage to the outside of shell structure 110 can be reduced. 52*a*, 52*b*, 52*c*, 52*d*, and 52*e* in FIG. 18 show the arrangement of individual speakers located inside speaker array 52. Five speakers 52*a* to 52*e* are shown for convenience, but the number of speakers may be other than 5. Speakers 52*a* to 52*e* are disposed vertically with respect to the floor surface of shell structure 110. Such an arrangement has an effect of facilitating the wave field synthesis of the voice signal output from each speaker configuring speaker array 52 such that the sound emitted by speaker array 52 has a directivity so as to be prevented from leaking to the outside of the shell beyond the edge of shell structure 110.

Although the longitudinal direction of speaker array 52 is disposed in the vertical direction, the longitudinal direction does not necessarily need to be exactly aligned vertically. For example, the longitudinal direction of speaker array 52 may be deviated from the vertical direction and slanted, or when the direction of the edge of shell structure 110 is, for example, the horizontal direction or the vertical direction, speaker array 52 may be disposed such that the longitudinal direction of speaker array 52 is perpendicular to the edge direction of shell structure 110. Further, the intervals between the individual speakers of speaker array 52 may be irregular or uniform. When the surface of shell structure 110 is a curved structure, the speakers may be disposed side by side along the surface of the curved structure such that the distance between the individual speakers is substantially uniform.

That is, when the speakers configuring speaker array 52 are disposed such that the vertical distances from the floor surface to the installation locations are all different, the effects described above can be obtained.

In shell structure 110, content voice detection microphone 71 may be provided above the head of user U or the like to detect the content voice leaking to the outside of the shell, and the sound pressure level of the voice output from speaker array 52 and low frequency speaker 54 may be adjusted such that the voice is equal to or less than the threshold value.

As described above, voice control system 3 according to the third exemplary embodiment has the same effect as that of the first exemplary embodiment except for the noise reduction effect even when the noise reduction process is not executed. That is, while preventing sound leakage, it is possible to complement the sounds in different frequency bands with each other by low frequency speaker 54 and speaker array 52, and it becomes possible to reproduce the sound of content in a wide band near the head of user U. User U can view the content without using headphones or earphones.

In voice control system 3, tweeter 53 (FIG. 12) may be provided instead of speaker array 52, and sound image controller 15 may not be provided, as in the first exemplary embodiment.

4. Other Exemplary Embodiments

As described above, the above-described exemplary embodiments have been described as examples of the technique disclosed in the present application. However, the technique in the present disclosure is not limited to these exemplary embodiments, and can be applied to exemplary embodiments in which changes, replacements, additions, omissions, and the like are made as appropriate. It is also possible to combine the components described in the above exemplary embodiments to form new exemplary embodiments.

(1)

In shell structure 110, the position of the head of user U, which is a control point, changes. By controlling the speaker according to the change in the control point, a more effective sound field space can be formed. For example, the change in the position of the control point can be fed back to the filter control in the wave field synthesis process of speaker array 52 and the control of the sound pressure level of the speaker.

Figure 16:
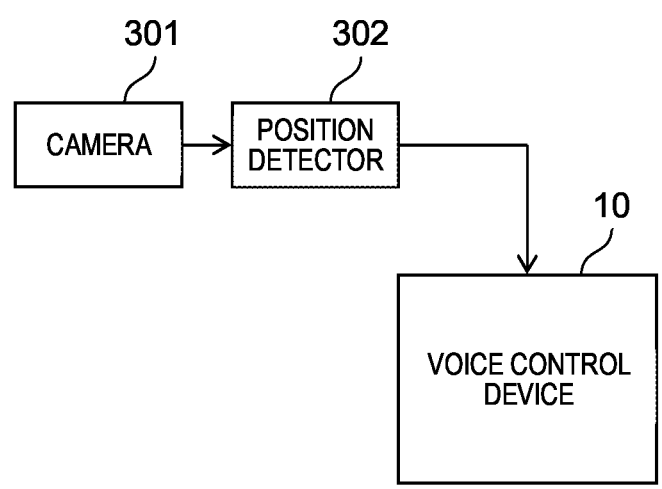
FIG. 16 partially shows the configuration of a voice control system according to another exemplary embodiment.

As shown in FIG. 16, voice control system 1 or 2 or 3 (FIGS. 6, 15 and 17) may be provided with camera 301 that is installed in shell structure 110 to image user U, and position detector 302 executed by the processor. Position detector 302 analyzes the image from camera 301 and detects the position of the head of user U in shell structure 110. The detected position information is transmitted to, for example, sound image controller 15 of voice control device 10 or the controller of DSP 11 that controls the sound pressure level. This makes it possible to form a sound field corresponding to the position of the control point.

(2)

The arrangements and numbers of speakers and microphones are not limited to the above example.

(3)

Voice control system 1 or 2 or 3 is not limited to being mounted in aircraft 100. Voice control system 1 or 2 or 3 may be installed in other vehicles such as helicopters, trains, and buses. Further, voice control system 1 or 2 or 3 may be installed not only in a vehicle but also in a building or the like where noise is generated.

(4)

In the above exemplary embodiments, a part or all of the process of each functional block may be implemented by a program. A part or all of the process of each functional block of each of the above exemplary embodiments may be executed by the processor in the computer. Further, the program for performing each process may be stored in a storage device such as a hard disk or a ROM, read into the ROM or a RAM, and executed.

In the above exemplary embodiments, instead of a processor such as a DSP or a CPU, a processor composed of a dedicated electronic circuit designed to implement a predetermined function may be included.

Further, the processor may be configured by one or a plurality of processors.

(5)

Figure 11:
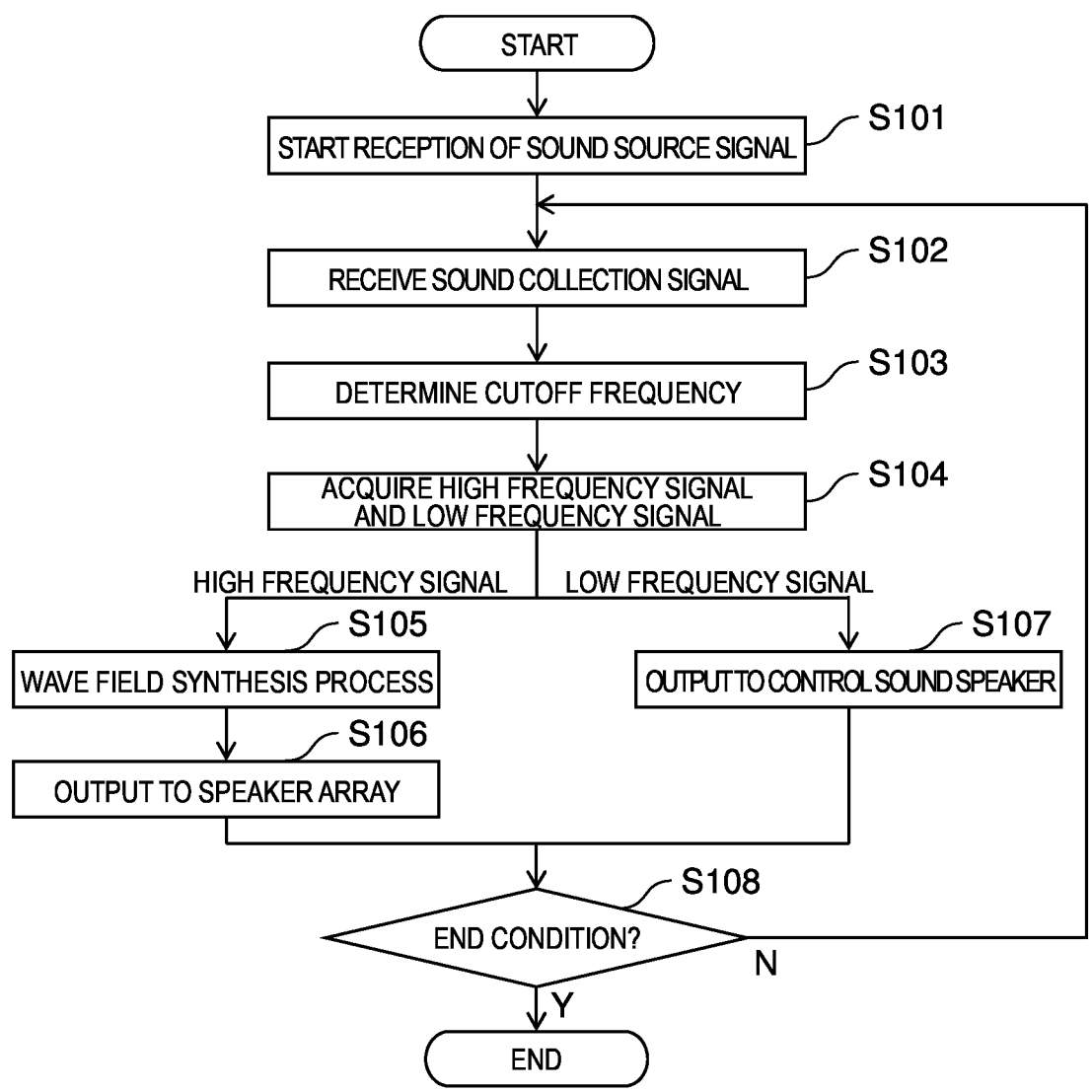
FIG. 11 is a flowchart showing the operation of a voice control device according to the first exemplary embodiment.

Each process of the sound field control method shown in FIG. 11 is not necessarily limited to the above description, and the execution order can be changed or the processes can be executed at the same time without departing from the gist of the invention.

(6)

In the present disclosure, devices or systems refer to a set of a plurality of components (devices, modules (component), or the like), and it does not matter whether or not all the components are in the same housing. Further, a plurality of devices housed in separate housings and connected via a network, and one device in which a plurality of modules are housed in one housing may be both referred to as a system in some cases.

REFERENCE MARKS IN THE DRAWINGS 1, 2, 3: Voice control system
5: Speaker group
7: Microphone group
8: Management device
10: Voice control device
12: Frequency determination unit
13: Band controller
14: Seat management unit
15: Sound image controller
15a, 15b: Wave field synthesis filter
17: Noise reduction controller
20: D/A converter group
21, 22: D/A converter
30: A/D converter group
31, 32: A/D converter
40: Network card
51: Control sound speaker
52: Speaker array
52a: Speaker
52b: Speaker
52c: Speaker
52d: Speaker
52e: Speaker
53: Tweeter
54: Low frequency speaker
71: Content voice detection microphone
72: Noise microphone
73: Error microphone
80: Sound source data
90a: Back cushion
90b: Seat cushion
90c: Leg cushion
100: Aircraft
100a: Cabin
100w: Wall
101a: Wing
101b: Wing
102a: Engine
102b: Engine
103a: Seat row
103b: Seat row
103c: Seat row
105: Seat
110: Shell structure
171: Adaptive filter
172: Coefficient update unit
301: Camera
302: Position detector

The invention claimed is:

1. A control device that controls output of signals from a plurality of speakers, the plurality of speakers including a first speaker and a second speaker, the second speaker suitable for outputting sound of a higher frequency than the first speaker, the plurality of speakers being in a predetermined space, the control device comprising:
 a sound source signal input unit that receives a sound source signal of a content from a sound source;
 a sound collection signal input unit that receives a sound collection signal which is collected in the predetermined space and includes a content reproduction signal of the content output from at least one of the plurality of speakers;
 a frequency determination unit that determines a cutoff frequency, based on a frequency or a frequency band in which a sound pressure level of the content reproduction signal is equal to or higher than a sound pressure level of a noise signal;
 a band controller that acquires a high frequency signal in a first frequency band equal to or higher than the cutoff frequency and a low frequency signal in a second frequency band equal to or lower than the cutoff frequency, from the sound source signal; and
 an output unit that outputs the low frequency signal to the first speaker, and outputs the high frequency signal to the second speaker.

2. The control device according to claim 1, wherein the noise signal has a frequency characteristic that the sound pressure level is higher as a frequency is lower.

3. The control device according to claim 1, wherein the frequency determination unit changes the cutoff frequency, according to a change in the frequency or the frequency band in which the sound pressure level of the content reproduction signal is equal to or higher than the sound pressure level of the noise signal.

4. The control device according to claim 1, further comprising:
a noise reduction controller that generates a control sound signal for reducing the noise signal, wherein
the output unit outputs the control sound signal to the first speaker.

5. The control device according to claim 1, wherein the frequency determination unit determines the cutoff frequency, according to a frequency band of the low frequency signal output from the first speaker.

6. A control system comprising:
the control device according to claim 1;
the first speaker connected to the control device;
the second speaker connected to the control device; and
a microphone that collects in the predetermined space.

7. The control system according to claim 6, wherein the second speaker includes a second plurality of speakers disposed in a row.

8. The control system according to claim 7, wherein
the control device includes a sound image controller that localizes a sound image in a vicinity of a predetermined control point different from the second speaker, by controlling at least one of a phase and a sound pressure level of the high frequency signal output from the second speaker, and
the predetermined control point is at a position of a head of a user in the predetermined space.

9. The control system according to claim 8, wherein
the control device includes a noise reduction controller that generates a control sound signal for reducing the noise signal,
the first speaker outputs the control sound signal, and
the first speaker is disposed at a position closer to the predetermined control point in the predetermined space.

10. The control system according to claim 8, further comprising:
a camera that images the user in the predetermined space; and
a position detector that acquires the position of the predetermined control point, by detecting a position of the user in the predetermined space, based on an image from the camera.

11. The control system according to claim 7, wherein the frequency determination unit determines the cutoff frequency, according to a number of the plurality of speakers.

12. A control method that controls output of signals from a plurality of speakers, the plurality of speakers including a first speaker and a second speaker, the second speaker suitable for outputting sound of a higher frequency than the first speaker, the plurality of speakers being in a predetermined space, the control method comprising:
acquiring a sound source signal of a content from a sound source;
acquiring a sound collection signal which is collected in the predetermined space and includes a content reproduction signal of the content output from at least one of the plurality of speakers;
determining a cutoff frequency, based on a frequency or a frequency band in which a sound pressure level of the content reproduction signal is equal to or higher than a sound pressure level of a noise signal;
acquiring a high frequency signal in a first frequency band equal to or higher than the cutoff frequency and a low frequency signal in a second frequency band equal to or lower than the cutoff frequency, from the sound source signal;
outputting the low frequency signal to the first speaker; and
outputting the high frequency signal to the second speaker.

13. The control device according to claim 1, further comprising:
a sound image controller that generates a plurality of sound image control signals for controlling sound images of the plurality of speakers, by controlling at least one of a phase and a sound pressure level of the high frequency signal.

14. The control system according to claim 7, wherein the second plurality of speakers configuring the second speaker is disposed such that distances in a vertical direction from a floor surface to installation locations are all different.

15. A control device that controls output of signals from a plurality of speakers, the plurality of speakers including a first speaker and a second speaker, the second speaker suitable for outputting sound of a higher frequency than the first speaker, the plurality of speakers being in a predetermined space, the control device comprising:
a sound source signal input that receives a sound source signal of a content from a sound source;
a sound collection signal input that receives a sound collection signal which is collected in the predetermined space and includes a content reproduction signal of the content output from at least one of the plurality of speakers;
a processor; and
a memory including a program that, when executed by the processor, causes the processor to:
determine a cutoff frequency, based on a frequency or a frequency band in which a sound pressure level of the content reproduction signal is equal to or higher than a sound pressure level of a noise signal;
acquire a high frequency signal in a first frequency band equal to or higher than the cutoff frequency and a low frequency signal in a second frequency band equal to or lower than the cutoff frequency, from the sound source signal; and
output the low frequency signal to the first speaker; and
output the high frequency signal to the second speaker.

* * * * *